United States Patent [19]

Callahan et al.

[11] Patent Number: 5,693,121
[45] Date of Patent: Dec. 2, 1997

[54] SEMI-PERMEABLE MEMBRANE SEPARATION PROCESS FOR THE PRODUCTION OF VERY HIGH PURITY NITROGEN

[75] Inventors: Richard A. Callahan, Winooski; Kishore V. Khandavalli, Burlington, both of Vt.

[73] Assignee: Enerfex, Inc., Williston, Vt.

[21] Appl. No.: 552,466

[22] Filed: Nov. 9, 1995

Related U.S. Application Data

[63] Continuation-in-part of Ser. No. 341,080, Nov. 17, 1994, abandoned.

[51] Int. Cl.$^6$ .................. B01D 53/22; B01D 53/26
[52] U.S. Cl. ..................... 95/39; 95/51; 95/55
[58] Field of Search ..................... 95/39, 45, 51, 95/54, 55

[56] References Cited

U.S. PATENT DOCUMENTS

| | | | |
|---|---|---|---|
| 4,130,403 | 12/1978 | Cooley et al. | 95/51 X |
| 4,386,944 | 6/1983 | Kimura | 95/51 |
| 4,435,191 | 3/1984 | Graham | 95/51 |
| 4,493,714 | 1/1985 | Ueda et al. | 95/51 X |
| 4,521,224 | 6/1985 | Li | 95/51 X |
| 4,561,864 | 12/1985 | Klass et al. | 95/51 X |
| 4,597,777 | 7/1986 | Graham | 95/51 |
| 4,639,257 | 1/1987 | Duckett et al. | 95/51 X |
| 4,690,873 | 9/1987 | Makino et al. | 95/51 X |
| 4,717,393 | 1/1988 | Hayes | 95/51 |
| 4,717,395 | 1/1988 | Chiao | 95/51 |
| 4,781,907 | 11/1988 | McNeill | 95/51 X |
| 4,851,014 | 7/1989 | Jeanes | 95/51 |
| 4,874,401 | 10/1989 | Jeanes | 95/51 |
| 4,894,068 | 1/1990 | Rice | 95/51 |
| 4,990,168 | 2/1991 | Sauer et al. | 95/51 X |
| 5,051,114 | 9/1991 | Nemser et al. | 95/51 X |
| 5,102,432 | 4/1992 | Prasad | 55/16 |
| 5,120,329 | 6/1992 | Sauer et al. | 95/51 X |
| 5,233,837 | 8/1993 | Callahan | 62/38 |
| 5,282,969 | 2/1994 | Xu | 95/45 X |
| 5,482,539 | 1/1996 | Callahan | 95/51 |

FOREIGN PATENT DOCUMENTS 63-305915  12/1988  Japan ......................... 95/51

*Primary Examiner*—Robert Spitzer
*Attorney, Agent, or Firm*—Sughrue, Mion, Zinn, Macpeak & Seas, PLLC

[57] ABSTRACT

A semi-permeable gas membrane process is described for the separation of very high purity nitrogen from a process feed gas mixture that is predominantly nitrogen, and one or more other permeable gases, which process comprises providing a feed gas mixture under pressure to a membrane separator unit comprising a semi-permeable separation membrane with respect to which the largest fraction of the other permeable gases is at least 20 times more permeable than nitrogen, to provide a very high purity raffinate nitrogen gas product.

20 Claims, 2 Drawing Sheets

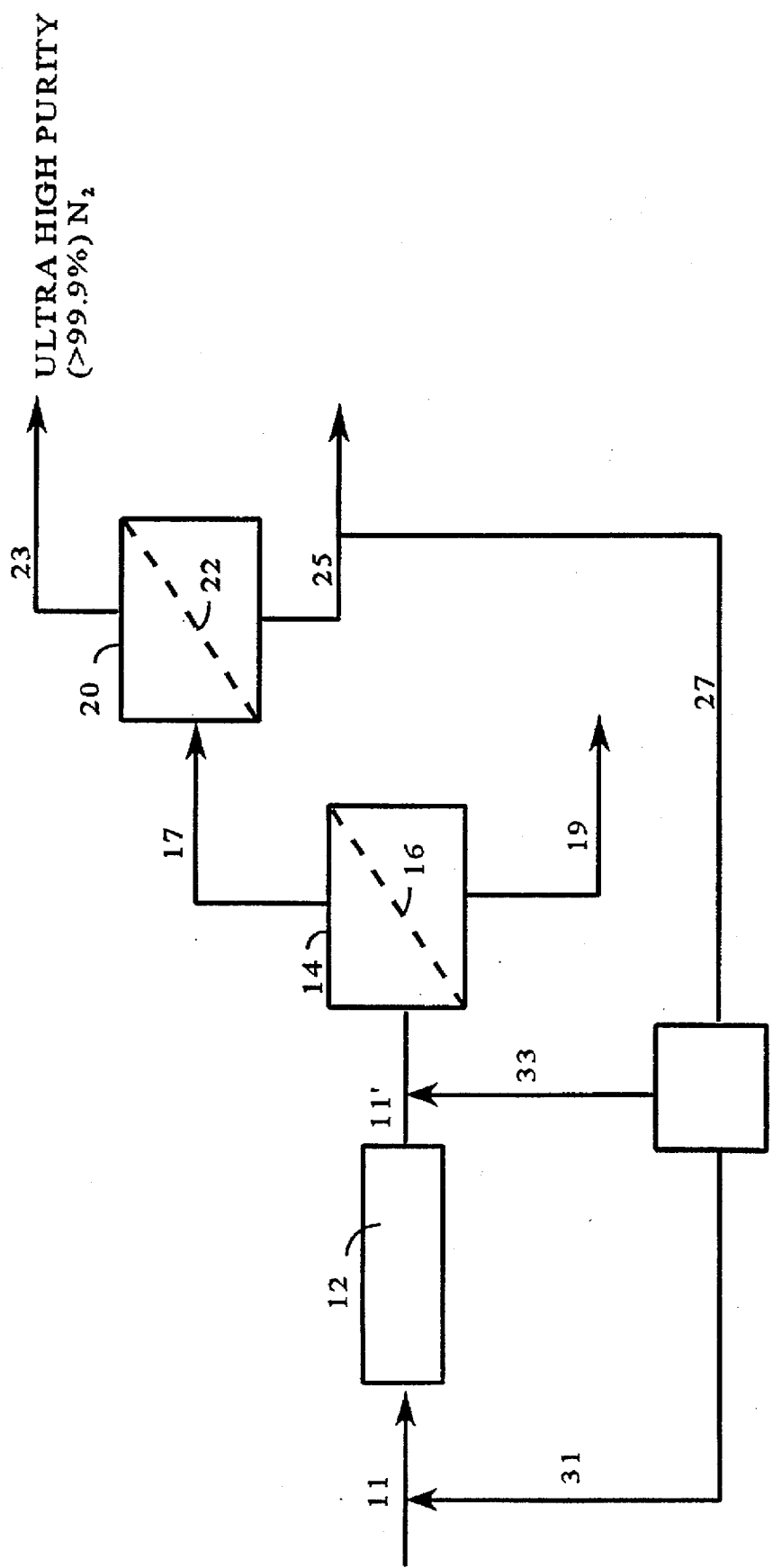

SEMI-PERMEABLE MEMBRANE SEPARATION PROCESS FOR THE PRODUCTION OF VERY HIGH PURITY NITROGEN

This is a Continuation-In-Part of application Ser. No. 08/341,080, filed Nov. 17, 1994, now abandoned.

FIELD OF THE INVENTION

The present invention relates to a process for the separation and production of very high purity ($\geq 99.5$ vol. %) nitrogen recovered from process gas streams that are predominantly (i.e., >50 vol. %) nitrogen and one or more of certain other permeable gases using an apparatus comprising one or more semi-permeable solution-diffusion membrane separation stages.

BACKGROUND OF THE INVENTION

Several membrane separation processes have been developed to produce high purity gases such as nitrogen from air, carbon dioxide from process gas streams, and hydrogen from refinery and reforming process gases. Generally, all these processes produce a high purity gas product, i.e, up to about 99 vol. % purity. For example, membrane-based separation of air, which consists mainly of nitrogen and oxygen, recovers high purity nitrogen while oxygen is rejected in a waste stream. The separation factor for oxygen over nitrogen is typically only 4–6 for existing commercial membranes. These low separation factors or selectivities make the separation difficult, thus requiring higher membrane areas to achieve a given purity and recovery. Thus, in the case of providing purified nitrogen gas, and particularly in the case of providing very high purity ($\geq 99.5$ vol. %) nitrogen gas, a need has existed to develop membranes and processes with improved separation factors.

SUMMARY OF THE INVENTION

In accordance with the present invention, there is provided a separation process to produce very high purity ($\geq 99.5$ vol. %) nitrogen from a process feed gas mixture that is predominantly nitrogen, and one or more other permeable gases, which process comprises providing said feed gas mixture under pressure to a membrane separator unit comprising a semi-permeable separation membrane with respect to which the largest fraction of the other permeable gases is at least 20 times more permeable than nitrogen, to provide a very high purity raffinate nitrogen gas product. In a semi-permeable membrane, the separation factor between two gases is known as the selectivity between the gases, which is defined as the ratio of permeability of the individual gases. The present invention utilizes at least a five fold higher separation factor between nitrogen and another gas constituting the largest fraction of the other permeable gases, e.g., hydrogen, carbon dioxide, or hydrogen sulfide, compared to the separation factor between nitrogen and oxygen. In many cases a relatively higher $N_2$ feed concentration makes the separation relatively easier and increases the productivity of the membrane separator unit.

BRIEF DESCRIPTION OF THE DRAWING

FIG. 2 illustrates a preferred embodiment of the process of the present invention wherein the very high purity ($\geq 99.5$ vol. %) raffinate nitrogen stream is further purified in an additional purification step to provide an ultra high purity (>99.9 vol. %) nitrogen gas product by providing the very high purity nitrogen gas product, as an intermediate product, to a second membrane separator unit comprising a second semi-permeable separation membrane having subatmospheric pressure on the permeate side thereof.

DETAILED DESCRIPTION OF THE INVENTION

Figure 1:
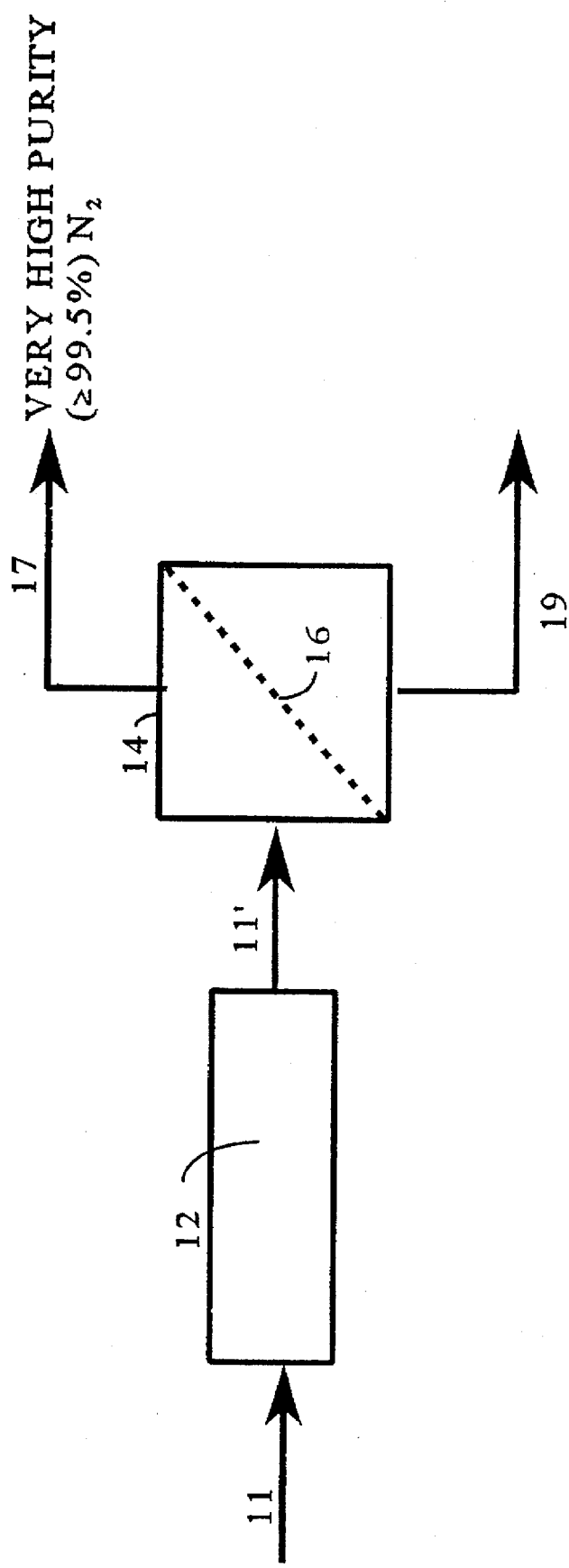
FIG. 1 illustrates the process of the present invention wherein the process feed gas mixture is subjected to optional pretreatment and is separated in a membrane separator unit to produce a very high purity raffinate nitrogen gas stream.

In accordance with the present invention, there is provided a membrane process having higher separation factors for nitrogen to thereby produce very high purity nitrogen. The present invention comprises a process which provides a feed gas source to recover nitrogen and a membrane separation process, where nitrogen is separated not from compositions wherein oxygen is a significant component (i.e., the $O_2$ content is $\leq 5$ vol. %), but rather from other gas compositions, wherein, in addition to the predominant (>50 vol. %) nitrogen, the largest fraction of the other permeable gases is a gas other than oxygen. As used herein with respect to all % indications of gas content, volume % (vol. %) is to be understood. For example, sources such as fossil fuel combustion exhaust mainly consists of nitrogen and carbon dioxide after the removal of water. Typical separation factors for $CO_2$ over $N_2$ are 20–60, which are five to ten times higher than those of $O_2$ over $N_2$. Typical separation factors for $H_2$ over $N_2$ are 200–600, which are 50 to 100 times higher than those of $O_2$ over $N_2$.

Thus the present invention emphasizes separating $N_2$ from gases such as $H_2$ and $CO_2$ instead of from $O_2$ in air; this takes advantage of the higher separation factors that are typical of commercially available air separation membranes.

Further by way of example, a natural gas combustion exhaust is typically comprised of 12% carbon dioxide and 88% nitrogen after removal of the water, based on the stoichiometric air-to-fuel ratio. Another example of such a process stream source is a limekiln vent gas, which typically contains about 79% $N_2$, 20% $CO_2$, and 1% $O_2$ after removal of the water. In the foregoing examples, the higher separation factor typical for $CO_2$ over $N_2$ makes the separation much easier compared to separation of nitrogen from air. In accordance with the present invention, smaller membrane separators are required to achieve similar purities and recoveries of $N_2$ compared with conventional membrane air separators.

In accordance with one embodiment of the present invention, and referring to FIG. 1, nitrogen is separated from a process feed gas source 11 containing predominantly nitrogen, and carbon dioxide as the second largest fraction (i.e., the largest fraction of the other permeable gases), on a dry basis, taking advantage of the higher separation factors between the two primary gases, $CO_2$ and $N_2$. The separation factors reported in the literature for $CO_2$ over $N_2$ are typically between 20 and 60 for various commercially available membranes.

The process feed gas mixture 11, which contains $N_2$ and $CO_2$ on a dry basis is subjected to necessary pretreatment 12, such as particle removal, compression, and dehydration. Typically, a process feed gas may be available at a higher temperature, a higher pressure, may contain some suspended particles, or may also contain small amounts to traces of undesirable gases such as carbon monoxide, SOX, and NOX. Depending on the case, the process gas may be water-cooled or water-scrubbed, filtered, or may even be subjected to a chemical or catalytic process before the separation. Generally, the process gas feed stream is cooled in a heat exchanger using cooling water available, for example, at 85° F., from a cooling tower or any other source. Due to the reduced temperature of the feed gas, some of the water is condensed and removed. After the water is removed, the process gas is in a saturated condition.

If the process gas is not available at this point at an adequate pressure, the feed gas is pressurized to about 80–200 psig in a compressor. The compressed gas is again cooled in a heat exchanger, using, for example, 85° F. cooling water. Due to the change in the pressure of the process feed gas, some additional water is condensed and removed. The process gas now free of most of the water is heated to above the dew point.

The pressurized process feed gas 11' is then fed to the membrane separator stage 14 containing a semi-permeable membrane 16, to produce a high pressure raffinate stream 17 which is rich in nitrogen, and a permeate stream 19 rich in carbon dioxide. The temperature of the feed gas entering the membrane separator stage may vary, but is typically 75°–115° F., and the temperature of the two product streams are also typically 75–115° F. The nitrogen purity in the raffinate is ≧99.5 vol. % and the carbon dioxide content in the permeate is typically 30–50%.

As illustrated in FIG. 2, higher purities of nitrogen in the raffinate can be achieved by passing the high pressure raffinate through a secondary membrane stage 20 using a second semi-permeable membrane 22, or using any other purification step. A compressor (not shown) may be used to increase the raffinate pressure if required. The raffinate nitrogen gas product 23 from a process according to the invention employing a secondary membrane typically can reach a very high purity of >99.5 vol. %, or even an ultra high purity of >99.9 vol. % nitrogen. The permeate gas stream 25 from the secondary membrane stage 20 may be recycled 27 to the feed of the first membrane separator unit by combination via 31 with process feed gas mixture 11, or, with pressurization, by combination via 33 with pressurized process feed gas 11'.

Other subsequent purification procedures such as cryogenic purification or adsorption processes may also be adopted.

In a preferred embodiment of this invention, the feed gas mixture is a compressed feed gas stream of predominantly nitrogen, and contains carbon dioxide in a concentration of from 10% to 30 vol. %.

In another preferred aspect, there is provided a compressed non-permeate raffinate product stream which is nitrogen in a concentration of from 99.9 vol. % to 99.9995 vol. %.

In another preferred aspect, the permeate waste stream is predominantly nitrogen and has a carbon dioxide concentration of from 27.0 vol. % to 30.0 vol. %.

In yet another preferred aspect, the feed gas mixture:non-permeate raffinate gas product ratio is not more than 1.8:1, to provide a product to feed recovery of at least 56% at 99.9995 vol. % nitrogen product purity.

According to a further preferred aspect of the process of the present invention, the process is carried out at a production efficiency of at least 2 standard cubic feet of nitrogen per minute per compression horsepower at 99.9995 vol. % nitrogen product purity.

In another preferred aspect, the membrane requirement per standard cubic foot of non-permeate raffinate nitrogen gas product at 99.9995 vol. % purity (in the case of carbon dioxide from nitrogen separation) is less than 1/10ths that of an air separation membrane requirement per standard cubic foot at 99.5 vol. % nitrogen product purity.

In accordance with yet another preferred embodiment, the membrane requirement per standard cubic foot of non-permeate nitrogen product at 99.5 vol. % purity is less than 3/10ths that of an air separation membrane process at 99.5 vol. % nitrogen product purity.

Preferred semi-permeable separation membranes in accordance with the invention are made from at least one polymeric material selected from the group consisting of polyimide, cellulose acetate, polysulfone, polycarbonate, and polyphenylene oxide.

According to a further preferred embodiment of the invention, for the preparation of ultra high purity (>99.9 vol. %) nitrogen, after production of a very high purity raffinate nitrogen gas as an intermediate product in accordance with the basic embodiment of the invention of providing a feed gas mixture under pressure to a first membrane separator unit, the intermediate product is provided to a second membrane separator unit comprising a second semi-permeable separation membrane having sub-atmospheric pressure on the permeate side of the second separation membrane, to thereby provide an ultra high purity raffinate nitrogen gas product. Furthermore, such sub-atmospheric and sub-atmospheric pressure is preferably produced by use of a vacuum pump.

As to the second semi-permeable separation membrane, such is preferably made from at least one polymeric material selected from the group consisting of polyimide, cellulose acetate, polysulfone, polycarbonate, and polyphenylene oxide.

EXAMPLES OF THE PRESENT INVENTION

The present invention describes a process to recover very high purity (≧99.5 vol. %) nitrogen from a process feed gas containing predominantly nitrogen, and one or more other permeable gases, the largest fraction of which is at least 20 times more permeable than nitrogen. Combustion exhaust gas and limekiln vent gas are typical examples of preferred process feed gases in accordance with the present invention. The combustion exhaust example is described in detail below as a preferred embodiment.

Example 1

A natural gas combustion exhaust gas normally contains about 9.5% $CO_2$, 19% water, and 71.5% $N_2$, based on the stoichiometric air-to-fuel ratio. The combustion exhaust gas is normally available at atmospheric pressure and about 120°–150° F. after heat recovery in an economizer. Again referring to FIG. 1, this feed gas 11 is further cooled to about 95° F. in a heat exchanger using a cooling water source available, for example, at 85° F. The cooling water for the heat exchanger is supplied from a cooling tower or any other source. All of the condensed water from the cooled process gas stream is removed. At 95° F. and atmospheric pressure, the process gas contains about 5.5% by volume of moisture at saturated conditions. Additional drying equipment can be used to remove water to below saturated levels if the process equipment requires lower levels of moisture.

The treated process feed gas is then pressurized in a compressor to about 150 psig and is cooled in an after-cooler to about 95° F. using 85° F. cooling tower water. Water that is further condensed due to the new equilibrium conditions is removed and the saturated moisture content in the feed gas at 95° F. and 150 psig is about 0.5%. Additional drying equipment further reduces water content. The dried pressurized gas 11' is then supplied in a membrane separator stage 14 to a membrane 16 made of polycarbonate polymer to produce a raffinate product stream of very high purity nitrogen 17 containing ≧99.5 vol. % $N_2$, and a permeate stream 19 containing about 30% $CO_2$. Most of the remaining water in the feed stream permeates through and is present in the permeate stream.

The raffinate from the membrane separator is at about 140 psig and 95° F. and contains ≧99.5 vol. % $N_2$. Higher purities of $N_2$ can be achieved, referring to FIG. 2, by passing this raffinate stream 17 through a second membrane separator stage 20 using a second semi-permeable membrane 22, using sub-atmospheric permeate pressure, preferably by means of a vacuum pump, and preferably with recycling 27 of the permeate gas stream from the secondary membrane stage to the feed of the first membrane separator unit, or using a cryogenic purification step or other purification processes. This additional purification step is cost effective because the ≧99.5 vol. % raffinate is already available at high pressure.

Example 2

The chemical reaction involved in ammonia production is

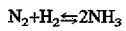

$$N_2 + H_2 \rightleftharpoons 2NH_3$$

The equilibrium yield of ammonia is increased by increasing pressure. Temperature increase produces the opposite effect on the equilibrium, but increases the rate of reaction. Modern designs use pressures of 15 to 30 MPa at around 500° C. At these conditions the above equilibrium reaction does not go to completion and there are some unreacted reactants in the outlet of the reactor. Outlet concentrations of ammonia are 16 to 25%. The outlet gases are cooled to separate ammonia from the unreacted reactants. The unreacted gases are essentially a mixture of $N_2$ and $H_2$.

Higher selectivities of $H_2$ over $N_2$ (200–600) of polymeric membranes can be made use of to separate the unreacted gases. $H_2$ is more permeable than $N_2$, and will be collected on the permeate side of the membrane.

In accordance with the present invention, the raffinate stream containing ≧99.5 vol. % $N_2$ can be used as a product such as a blanket agent (e.g., for semiconductor manufacture, metal heat treating, etc.) or for any other useful purpose. This raffinate product can also be further purified in another membrane separator to achieve even higher purities of $N_2$ or to make liquid nitrogen.

While the invention has been described in detail and with reference to embodiments thereof, it will be apparent to one skilled in the art that various changes and modifications can be made therein without departing from the spirit and scope thereof.

What is claimed is:

1. A semi-permeable gas membrane process for the separation of very high purity nitrogen of ≧99.5 vol. % from a process feed gas mixture that is predominantly nitrogen, and one or more other permeable gases, obtained from ammonia production, from stoichiometric combustion, or from combustion gas after treatment by a chemical or catalytic process, such that the $O_2$ content is ≦5 vol. %, which semi-permeable gas membrane process comprises providing said feed gas mixture under pressure to a membrane separator unit comprising a semi-permeable separation membrane with respect to which the largest fraction of the other permeable gases is a least 20 times more permeable than nitrogen, to provide a very high purity raffinate nitrogen gas product of ≧99.5 vol. % nitrogen.

2. A semi-permeable gas membrane process as in claim 1, which further comprises a pretreatment step wherein the process feed gas mixture is cooled, compressed, and dried.

3. A semi-permeable gas membrane process as in claim 1, wherein the gases obtained from either the stoichiometric combustion or the combustion gas after treatment by a chemical or catalytic process comprises products of fossil fuel combustion.

4. A semi-permeable gas membrane process as in claim 3, wherein the process feed gas mixture contains 79 vol. % or more of nitrogen.

5. A semi-permeable gas membrane process as in claim 1, wherein the gases obtained from either the stoichiometric combustion or the combustion gas after treatment by a chemical or catalytic process comprises vent gas from a limekiln.

6. A semi-permeable gas membrane process as in claim 1, wherein the largest fraction of the other permeable gases is carbon dioxide, and said semi-permeable separation membrane has a selective permeability for carbon dioxide over nitrogen of at least 20 times.

7. A semi-permeable gas membrane process as in claim 6, which further comprises a membrane requirement per standard cubic foot of non-permeate raffinate nitrogen gas product at 99.9995 vol. % purity which in the case of carbon dioxide from nitrogen separation is less than 4/10ths that of an air separation membrane requirement per standard cubic foot at 99.5 vol. % nitrogen product purity.

8. A semi-permeable gas membrane process as in claim 6, wherein said semi-permeable separation membrane is made from at least one polymeric material selected from the group consisting of polyimide, cellulose acetate, polysulfone, polycarbonate, and polyphenylene oxide.

9. A semi-permeable gas membrane process as in claim 1, wherein said feed gas mixture is a compressed feed gas stream of predominantly nitrogen, and contains carbon dioxide in a concentration of from 10% to 30 vol. %.

10. A semi-permeable gas membrane process as in claim 1, wherein there is provided a compressed non-permeate raffinate product stream which is nitrogen in a concentration of from 99.9 vol. % to 99.9995 vol. %.

11. A semi-permeable gas membrane process as in claim 1, which further comprises a permeate waste stream which is predominantly nitrogen and has a carbon dioxide concentration of from 27.0 vol. % to 30.0 vol. %.

12. A semi-permeable gas membrane process as in claim 1, which further comprises a feed gas mixture:non-permeate raffinate gas product ratio of not more than 1.8:1 to provide a product to feed recovery of at least 56% at 99.9995 vol. % nitrogen product purity.

13. A semi-permeable gas membrane process as in claim 1, carried out at a production efficiency of at least 2 standard cubic feet of nitrogen per minute per compression horsepower at 99.9995 vol. % nitrogen product purity.

14. A semi-permeable gas membrane process as in claim 1 which further comprises a membrane requirement per standard cubic foot of non-permeate nitrogen product at 99.5 vol. % purity which is less than 3/10ths that of an air separation membrane process at 99.5 vol. % nitrogen product purity.

15. A semi-permeable gas membrane process as in claim 1, wherein said semi-permeable separation membrane is made from at least one polymeric material selected from the group consisting of polyimide, cellulose acetate, polysulfone, polycarbonate, and polyphenylene oxide.

16. A semi-permeable gas membrane process as in claim 1, wherein the largest fraction of the other permeable gases is hydrogen, and said semi-permeable separation membrane has a selective permeability for hydrogen over nitrogen of at least 50 times.

17. A semi-permeable gas membrane process for the separation of ultra high purity nitrogen of >99.9 vol. % from a process feed gas mixture that is predominantly nitrogen, and one or more other permeable gases, obtained from ammonia production, from stoichiometric combustion, or from combustion gas after treatment by a chemical or catalytic process, such that the $O_2$ content is $\leq 5$ vol. %, which semi-permeable gas membrane process comprises providing said feed gas mixture under pressure to a first membrane separator unit comprising a first semi-permeable separation membrane with respect to which the largest fraction of the other permeable gases is a least 20 times more permeable than nitrogen, to provide a very high purity intermediate raffinate nitrogen gas product, and further providing said intermediate gas product to a second membrane separator unit comprising a second semi-permeable separation membrane having sub-atmospheric pressure on the permeate side of the second separation membrane, in order to provide an ultra high purity raffinate nitrogen gas product of >99.9 vol. % nitrogen.

18. A semi-permeable gas membrane process as in claim 17, wherein said sub-atmospheric pressure on the permeate side of the second separation membrane is provided by use of a vacuum pump.

19. A semi-permeable gas membrane process as in claim 17, wherein said second semi-permeable separation membrane is made from at least one polymeric material selected from the group consisting of polyimide, cellulose acetate, polysulfone, polycarbonate, and polyphenylene oxide.

20. A semi-permeable gas membrane process as in claim 17, wherein the permeate gas stream from the secondary membrane stage is recycled to the feed of the first membrane separator unit.

* * * * *